(No Model.)
A. F. WARD.
FEED WATER HEATER.
No. 352,377. Patented Nov. 9, 1886.
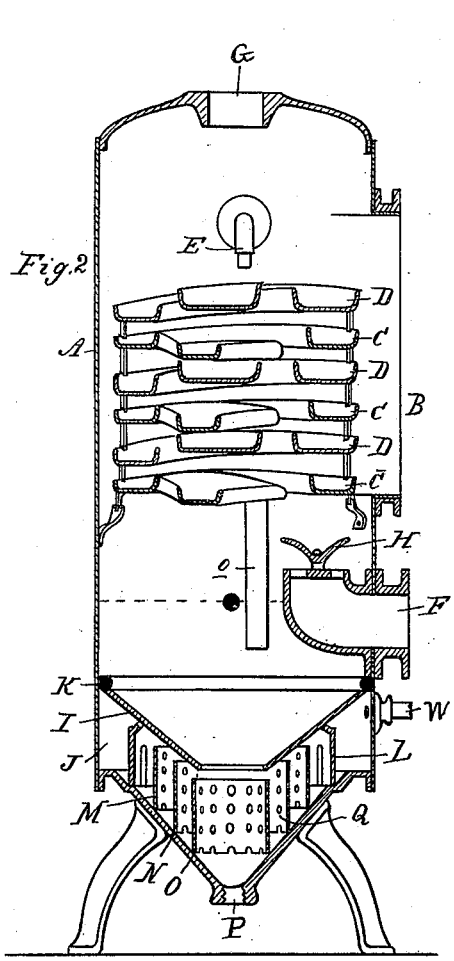
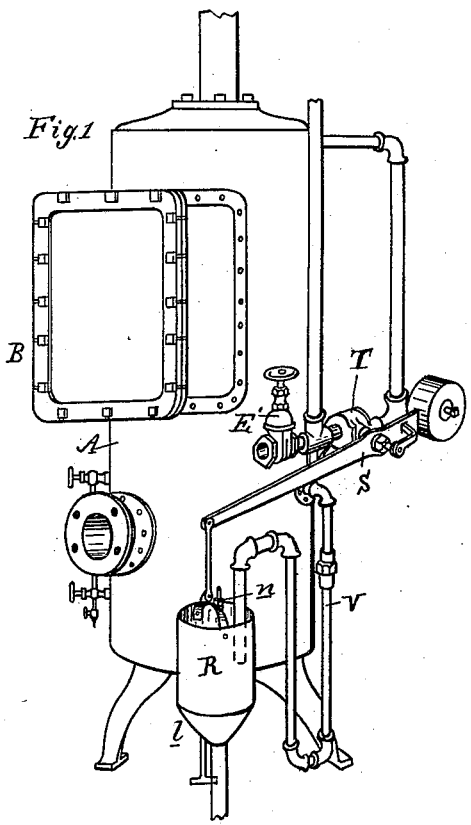
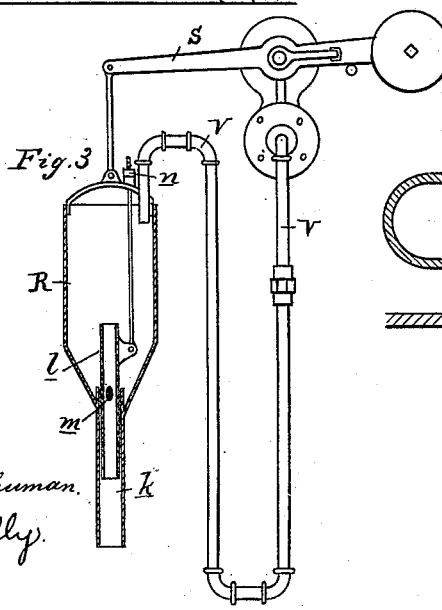
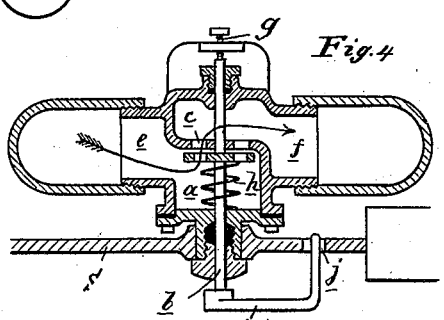
Attest:
John Schuman.
E. Scully.
Inventor:
Alexander F. Ward.
by his Atty
Thos. S. Sprague

UNITED STATES PATENT OFFICE.

ALEXANDER F. WARD, OF DETROIT, MICHIGAN.

FEED-WATER HEATER.

SPECIFICATION forming part of Letters Patent No. 352,377, dated November 9, 1886.

Application filed April 8, 1886. Serial No. 198,245. (No model.) Patented in Canada June 28, 1884, No. 19,684.

*To all whom it may concern:*

Be it known that I, ALEXANDER F. WARD, of Detroit, in the county of Wayne and State of Michigan, have invented new and useful Improvements in Feed-Water Heaters; and I do hereby declare that the following is a full, clear, and exact description thereof, reference being had to the accompanying drawings, which form a part of this specification.

This invention relates to a new and useful improvement in feed-water heaters and purifiers; and the invention consists in an improved construction and arrangement of different parts of the feed-water heater for which I have been granted heretofore Letters Patent No. 279,848.

My invention also consists in making the supply pulsating or intermittent in order to produce a pulsating or intermittent overflow which, at intervals, is copious enough to carry off the scum from the surface of the feed-water in the heater without wasting an inordinate amount of water, and consequently of heat.

Further, my invention consists in the peculiar construction, arrangement, and operation of a regulating-valve in the supply-pipe, whereby said valve is opened and closed automatically and the amount of supply regulated in accordance to the amount needed to supply the demands.

My invention also consists in certain improved settling and filtering arrangements by means of which the feed-water is mechanically freed of all impurities, all as hereinafter described.

In the drawings which accompany this specification, Figure 1 is a perspective view of my improved feed-water heater and purifier. Fig. 2 is a vertical central section thereof. Fig. 3 is a detached elevation of the devices by means of which the regulating overflow-valve is controlled automatically. Fig. 4 is a horizontal section of the regulating overflow-valve.

A is the shell or body of the heater, preferably made of boiler-iron, with cast-iron top and bottom, and provided with a door, B.

C and D are the pans, preferably made of cast-iron, as light as strength will permit. They form convolute water-ways, with little dams or weirs in them to retard the flow of the water. The lowest pan sets on lugs riveted to the shell, and all the other pans are removably supported thereon, one on top of the other and sufficiently far apart to permit the exhaust-steam to flow freely over and around them and through the openings between the convolutions. In the pans D the convolutions are suitably inclined to carry the water from the center toward the circumference, and in the pans C the water flows in the reverse way, each pan discharging through a hole in the bottom upon the next pan underneath, all as described in the above-mentioned Letters Patent.

E is the water-supply pipe arranged to discharge upon the top pan. It is provided with a suitable valve, E', for regulating the amount of supply, and has its discharge end preferably swiveled to permit of its being turned up to facilitate the removal of the pans through the door in the shell for cleaning.

F is the inlet for the exhaust-steam, placed below the pans; and G is an outlet therefor on top of the heater.

H is a spreader-disk secured above the inlet to diffuse the steam.

I is a conical deflector with a central opening. It divides off the settling-chamber J at the bottom of the heater. This plate fits loosely to the shell, and a ring, K, covered with hemp packing, is interposed between the edge of the deflector and the shell, thereby preventing any grease or oil from passing into the settling-chamber in case the water falls below the edge of the deflector. Underneath the deflector and supporting it is placed the circular screen L of cast-iron. It rests on an offset on the pot-shaped bottom of the heater and is provided with vertical slots around its periphery to permit the circulation of water and the collecting of the mud. Concentrically within the screen L are placed the screens M N O, all resting on the mud-pot and extending up to within a short distance of the deflector. These screens are suitably perforated to permit the water and mud to pass to the discharge P, and they subdivide the settling-chamber in a series of mud-cells, Q.

R is a bucket suspended from a lever, S, which is pivoted upon the stem of the regulator-valve T and carries a counter-weight at the other end, all so arranged that by the fall and rise of the bucket the lever closes and opens the regulator-valve, which, as shown, is located in the supply-pipe.

The regulator-valve is preferably constucted, as shown in Fig. 4, in horizontal section, in which $a$ is the perforated disk, $b$ the stem, $c$ the seat, $e$ the inlet, and $f$ the outlet, of a disk-valve of known construction. A set-screw, $g$, is arranged to act against the end of the stem of the valve-disk to permit of its being held adjustably a slight distance off its seat, and a spring, $h$, exerts its tension to hold it in its adjusted position. To the front end of the valve-stem is secured the handle $i$, which engages loosely into a hole, $j$, in the lever, all so arranged that by pulling on the handle $i$ the valve-disk may be raised from its seat.

V is the overflow-pipe. It is provided with a U-bend, and has its discharge end conducted into the bucket. The latter has the waste-pipe $k$ secured in its bottom, and projecting within the same is a sliding tube, $l$, open on top and provided with an opening, $m$, near its lower end. This tube is suspended from a hanger having an adjusting-nut, $n$, at its upper end, all so arranged that by adjusting the tube $l$ up or down the amount of overflow escaping through the opening $m$ can be adjusted, and if the overflow rises high enough in the bucket it may find an exit over the top edge of the sliding tube. Slime or other sediment accumulating in the bottom of the bucket is permitted to run out by lifting the sliding tube.

W is the hot-water feed-pipe leading from the settling-chamber J to the feed-pump of the boiler.

In practice the supply-water enters the heater through the pipe E, its amount being adjusted by the valve E', according to the needs of the boiler and the varying pressures of the supply in different localities. The water first flows over all the pans until from the last one it is discharged by a pipe, $o$, to a point below the ordinary water-line in the heater. In its course through the pans the water is heated by the steam entering through the pipe F and thoroughly boiled, whereby the lime and other inorganic matter heretofore held in solution is precipitated to the bottom and sides of the pans, from which it has to be removed from time to time. By the construction of the pans, the water is continually kept from the direct course of the moving steam, so that the latter cannot carry off any water, but what portion thereof escapes uncondensed through the opening in the top of the heater passes off as dry steam. Now, if the valve E' has been so adjusted that the supply is sufficient for the greatest amount of feed-water needed, there will be under ordinary conditions an excess which will cause an overflow through the pipe V into the bucket, and from there to the waste; but if the waste-opening $m$ is partially closed up the inflow of water into the bucket will be faster than the outflow, and gradually fill the bucket until its weight overcomes the counter-balance on the lever and causes the bucket to drop. The dropping of the bucket actuates the regulator-valve T and shuts off for a little time the supply until the bucket, becoming light by wasting its contents, is raised again by the counter-weight, when the supply is again fully turned on and kept on until a renewed overflow swings the bucket anew. The overflow should be sufficient to swing the bucket, under ordinary conditions of feed, about every two minutes, and if the demand of the pump should vary the valve E' need not be disturbed, as the amount of water which passes into the heater is automatically regulated by the regulating-valve, provided there is sufficient water permitted to flow through the valve E' to satisfy the greatest demand that may occur. By thus producing an intermittent overflow of water by means of the regulating feed-valve the following advantages are gained: The intermittent overflow of water thus obtained is copious enough to produce a current on the surface of the water in the heater to carry off through the overflow-pipe the oil, magnesia, and other floating impurities on the surface of the water in the heater. These matters are of a slimy nature and produce the foam, which, for well-understood reasons, is of a decidedly dangerous character when admitted into the boiler.

The heater is economical, as the overflow, acting only intermittently, wastes only a small amount of water to effect the purpose desired, whereas to effect the same purpose with a steady overflow there would be an inordinate waste of water, and, consequently, of heat.

The amount of water to be admitted into the heater need only be sufficient to satisfy the demand at any required speed of the pump and enough to produce an intermittent action of the bucket.

The overflow-pipe is always entirely open, and under no circumstances is a flooding of the heater likely to occur. The bucket cannot run over because the sliding tube forms a sufficiently large overflow for all the waste that may run into the bucket. A seal is formed against all possible escape of steam through the overflow-pipe, owing to any pressure of the steam in the heater by means of the U-shaped bend in the overflow-pipe.

To prevent the pans from running entirely dry in the intervals in which the regulating-valve is closed, I permit a sufficient amount of water to prevent this from passing through the regulating-valve. This may be accomplished by not closing said valve entirely; but I preferably accomplish it by keeping the disk slightly off its seat by means of the adjusting-screw $g$, which also prevents the wear of the valve-disk. By means of the handle $i$ the operator may draw the valve-disk away from its seat, thereby freeing the valve from obstructions likely to accumulate therein.

By conducting the water from the lower pan through the pipe $o$, below the surface of the heater, the scum on the surface of the water is not disturbed, and the water is kept from the direct course of the steam, the same as in the pans, thus preventing the steam from carrying any water out of the heater or disturbing the flow of the water, and thereby producing an irregular action or a loss of efficiency.

The screen L, and, if desired, the other screens in the settling-chamber, are preferably imperforate next to the outlet into the feed-pipe, and to prevent any of the cells in the settling-chamber from becoming entirely filled up with mud, and thus obstructing the outflow of water into the hot-water feed-pipe, I make the screens low enough to leave a free passage over the top edges thereof, while the screen L is made scalloped at the upper edge to permit of supporting the deflector I.

The deflector I conducts all the sediment into the settling-chamber and assists the settling of the water below it by guiding any currents that may be created by the discharge of the water from the pans or by the varying pressure of the exhaust-steam. It also prevents the possibility of any oil or scum that may be on the surface of the water in the heater being drained off into the feed. If the water should fall so as to be below the opening of the feed-pipe, in which case the pump would no longer work, the surface would still be several inches above the opening of the deflector.

What I claim as my invention is—

1. In a feed-water heater, an intermittent or pulsating feed-water supply controlled by the overflow as a means for producing an intermittent or pulsating overflow, substantially as and for the purposes described.

2. In a feed-water heater, a regulating-valve in the supply-pipe, arranged to control the amount of supply by an intermittent action at regulated intervals of shutting off the feed, or partly so, and actuated by the overflow, substantially as and for the purposes described.

3. In a feed-water heater, a regulating-valve in the supply-pipe, controlled by the overflow from the heater to intermittently and automatically shut off the water, or partly so, substantially as and for the purposes described.

4. In a feed-water heater, the combination of a regulating-valve in the supply-pipe, a bucket swung on a lever arranged to open and close said valve, an overflow arranged to discharge into the bucket, and a restricted waste-orifice in the bucket, all arranged to operate substantially as described.

5. In a feed-water heater, the combination of the regulating-valve T, bucket R, having a restricted waste-orifice and an overflow-pipe, V, all arranged to operate substantially as described.

6. The bucket R, arranged to operate the regulating-valve in the supply-pipe, said bucket being provided with the waste-pipe K, sliding tube $l$, having waste-orifice $m$, and adjusting-nut $n$, all arranged to operate substantially as described.

7. The combination of the overflow-pipe V, the bucket R, having a restricted waste-orifice near the bottom, the lever S, and its counterweight, all arranged to form an automatically intermittently-operating device to actuate the regulating-valve in the supply-pipe by means of any suitable connection therewith, substantially as described.

8. The regulating-valve T in the supply-pipe, provided with the spring $h$ and handle $i$, combined with the lever S, having hole I, to loosely receive said handle, arranged to operate as described.

9. In a feed-water heater, in combination with the supply, the series of heating-pans C D, and the pipe $o$, all arranged to keep the water while being heated from the direct course of the steam in the heater, substantially as and for the purpose described.

10. A settling-chamber formed in the bottom of the heater, and having the feed-pipe and blow off connected thereto, the combination of the deflector I, having ring K, the conical mud-pot Q, having blow-off P, the perforated screen L, and the screens M N O, all arranged substantially as described.

11. In a feed-water heater, the combination of the deflector I, having a central opening, the packing-ring K, the conical mud-pot Q, the screen L, having its upper edge scalloped, and the feed and blow-off pipes V P, all arranged substantially as described.

12. In a feed-water heater, the combination, with the settling-chamber having the feed-connection V, of a series of concentric screens resting on the conical bottom or mud-pot and permitting a free circulation of the water over their top edge, substantially as described.

ALEXANDER F. WARD.

Witnesses:
E. SCULLY,
CHARLES J. HUNT.